United States Patent
Li et al.

(10) Patent No.: US 12,483,311 B2
(45) Date of Patent: Nov. 25, 2025

(54) COMMUNICATION METHOD AND RELATED DEVICE

(71) Applicant: Huawei Technologies Co., Ltd., Shenzhen (CN)

(72) Inventors: Shengyu Li, Beijing (CN); Di Zhang, Shenzhen (CN); Kunpeng Liu, Beijing (CN); Yang Ding, Shenzhen (CN); Ruijie Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/405,760

(22) Filed: Jan. 5, 2024

(65) Prior Publication Data

US 2024/0146375 A1  May 2, 2024

Related U.S. Application Data

(63) Continuation of application No. PCT/CN2022/103034, filed on Jun. 30, 2022.

(30) Foreign Application Priority Data

Jul. 8, 2021 (CN) .......................... 202110776471.1
Apr. 29, 2022 (CN) .......................... 202210474379.4

(51) Int. Cl.
*H04B 7/06* (2006.01)
*H04L 5/00* (2006.01)

(52) U.S. Cl.
CPC ......... *H04B 7/0626* (2013.01); *H04L 5/0048* (2013.01)

(58) Field of Classification Search
CPC ... H04B 7/0626; H04B 7/0417; H04L 5/0048; H04L 1/00
See application file for complete search history.

(56) References Cited

U.S. PATENT DOCUMENTS

| | | | | |
|---|---|---|---|---|
| 2013/0343299 A1* | 12/2013 | Sayana | ............... | H04B 7/0417 370/328 |
| 2014/0086203 A1* | 3/2014 | Furuskar | ............... | H04L 5/0048 370/330 |
| 2023/0028703 A1* | 1/2023 | Khoshnevisan | ...... | H04W 52/36 |

FOREIGN PATENT DOCUMENTS

| | | | | |
|---|---|---|---|---|
| CN | 102255689 B | * | 5/2018 | .......... H04L 1/0026 |
| CN | 103220068 B | * | 10/2018 | |
| WO | 2020032856 A1 | | 2/2020 | |
| WO | 2021009552 A1 | | 1/2021 | |

OTHER PUBLICATIONS

"3rd Generation Partnership Project; Technical Specification Group Radio Access Network; NR; Physical layer procedures for data (Release 16)". 3GPP TS 38.214 V16.6.0 (Jun. 2021). total 172 pages.

* cited by examiner

*Primary Examiner* — Sophia Vlahos
(74) *Attorney, Agent, or Firm* — Slater Matsil, LLP

(57) ABSTRACT

Embodiments of this application provide a communication method and a related device. The method includes: A terminal device obtains a plurality of power offset values corresponding to one reference signal resource, determines a plurality of pieces of channel state information CSI based on the plurality of offset values, and sends some or all of the plurality of pieces of CSI to a network device. The network device may flexibly adjust data transmit power based on the plurality of power offset values and the plurality of pieces of corresponding CSI, and perform appropriate link adaptation adjustment.

19 Claims, 2 Drawing Sheets

COMMUNICATION METHOD AND RELATED DEVICE

CROSS-REFERENCE TO RELATED APPLICATIONS

This application is a continuation of International Application No. PCT/CN2022/103034, filed on Jun. 30, 2022, which claims priority to Chinese Patent Application No. 202210474379.4, filed on Apr. 29, 2022 and Chinese Patent Application No. 202110776471.1, filed on Jul. 8, 2021. All of the aforementioned patent applications are hereby incorporated by reference in their entireties.

TECHNICAL FIELD

This application relates to the field of communication technologies, and in particular, to a communication method and a related device.

BACKGROUND

In a communication system, a terminal device obtains channel state information by using a reference signal on a reference signal resource, and reports the channel state information to a network device. The network device schedules the terminal device based on the channel state information. To reduce energy consumption, the network device may actively reduce transmit power for data transmission. The network device indicates, to the terminal device by using configuration information of the reference signal, a power offset value corresponding to the reference signal resource. The terminal device reports the channel state information based on the power offset value corresponding to the reference signal resource. If transmit power for sending data after the network device reduces the data transmission power is different from that corresponding to the CSI reported by the terminal device based on the power offset value, the network device cannot perform appropriate link adaptation based on the CSI reported by the terminal device, and communication performance is affected.

SUMMARY

Embodiments of this application disclose a communication method and a related device, to reduce impact of a data transmission power change on performance of a communication system in a scenario of reducing energy consumption of a network device.

A first aspect of embodiments of this application discloses a communication method, including: receiving first indication information from a network device, where the first indication information indicates M power offset values of a reference signal resource, and M is an integer greater than or equal to 2; determining, based on the M power offset values, M pieces of channel state information CSI corresponding to the reference signal resource, where one power offset value corresponds to one of the M pieces of CSI; and sending N pieces of CSI in the M pieces of CSI to the network device, where N is a positive integer less than or equal to M.

According to the method, a terminal device determines, based on the M power offset values, the M pieces of channel state information CSI corresponding to the reference signal resource. This can reduce measurement complexity of the terminal device, and ensure flexibility and consistency between the network device and the terminal device.

In a possible implementation, N is a positive integer less than M.

In a possible implementation, N is a positive integer greater than or equal to 2 and less than M.

According to the method, the terminal device reports some of the M pieces of CSI determined based on the M power offset values. This can ensure that valid CSI is reported, and reduce reporting resources.

In a possible implementation, the method further includes: receiving second indication information from the network device. The second indication information indicates N power offset values corresponding to the N pieces of CSI.

In a possible implementation, transmission efficiency of any one of the N pieces of CSI is higher than transmission efficiency of any one of (M-N) pieces of CSI, and the (M-N) pieces of CSI are CSI other than the N pieces of CSI in the M pieces of CSI. The transmission efficiency of the any piece of CSI is determined based on at least one of an RI or a CQI of the any piece of CSI.

In a possible implementation, transmission efficiency of any one of the N pieces of CSI is higher than a predefined threshold, and the transmission efficiency of the any piece of CSI is determined based on at least one of an RI or a CQI of the any one piece of CSI.

According to the method, the terminal device may report only CSI with high transmission efficiency, to reduce reporting resources.

In a possible implementation, at least one column vector included in a precoding matrix corresponding to a PMI of the any one of the N pieces of CSI belongs to a precoding matrix corresponding to a PMI of first CSI, and the first CSI is CSI with a highest rank indicator in the N pieces of CSI.

According to the method, the terminal device needs to report only the precoding matrix corresponding to the PMI of the first CSI by using this manner, and the network device determines, based on the PMI of the first CSI, the precoding matrix corresponding to the PMI of the N pieces of CSI. This can reduce resources.

In a possible implementation, the N pieces of CSI include a $K1^{th}$ piece of CSI and a $K2^{th}$ piece of CSI, K1 and K2 are positive integers, K1 is less than K2, and an RI of the $K1^{th}$ piece of CSI is higher than or equal to an RI of the $K2^{th}$ piece of CSI.

In a possible implementation, the N pieces of CSI are sorted in descending order of RIs.

In a possible implementation, the N pieces of CSI are carried in first information, and the first information further includes identification information of the N power offset values corresponding to the N pieces of CSI.

According to the method, the terminal device reports the N pieces of CSI to the network device by using one piece of signaling. This can effectively reduce reporting overheads and improve information transmission efficiency.

In a possible implementation, the N pieces of CSI are sorted according to a predefined rule.

In a possible implementation, that the N pieces of CSI are sorted according to a predefined rule includes: The N pieces of CSI include an $L1^{th}$ piece of CSI and an $L2^{th}$ piece of CSI, L1 and L2 are positive integers, L1 is less than L2, and a power offset value corresponding to the $L1^{th}$ piece of CSI is greater than a power offset value corresponding to the $L2^{th}$ piece of CSI.

In a possible implementation, the method further includes: sending third indication information to the network device. The third indication information indicates location information of the CSI with the highest RI in the N pieces of CSI.

In a possible implementation, the first indication information is carried in configuration information of a non-zero power channel state information reference signal NZP CSI-RS.

A second aspect of embodiments of this application discloses a communication method, including: sending first indication information to a terminal device, where the first indication information indicates M power offset values of a reference signal resource, and M is an integer greater than or equal to 2; and receiving, from the terminal device, N pieces of CSI in M pieces of channel state information CSI corresponding to the reference signal resource, where the M pieces of channel state information CSI corresponding to the reference signal resource are determined by the terminal device based on the M power offset values, one power offset value corresponds to one of the M pieces of CSI, and N is a positive integer less than or equal to M.

In a possible implementation, N is a positive integer greater than or equal to 2 and less than M.

According to the method, a network device obtains CSI corresponding to a plurality of power offset values, so that the network device adjusts, based on a plurality of pieces of CSI, power for sending data. Power consumption of the network device is reduced while consistency between the network device and the terminal device is ensured. In a scenario of reducing energy consumption of the network device, impact of a data transmission power change on performance of a communication system is reduced.

In a possible implementation, N is a positive integer less than M.

In a possible implementation, the method further includes: sending second indication information to the terminal device. The second indication information indicates N power offset values corresponding to the N pieces of CSI.

According to the method, the network device explicitly indicates, by using the second indication information, the N power offset values corresponding to the N pieces of CSI. This can ensure flexibility and consistency between the network device and the terminal device.

In a possible implementation, transmission efficiency of any one of the N pieces of CSI is higher than transmission efficiency of any one of (M-N) pieces of CSI, and the (M-N) pieces of CSI are CSI other than the N pieces of CSI in the M pieces of CSI. The transmission efficiency of the any piece of CSI is determined based on at least one of an RI or a CQI of the any piece of CSI.

In a possible implementation, transmission efficiency of any one of the N pieces of CSI is higher than a predefined threshold, and the transmission efficiency of the any piece of CSI is determined based on at least one of an RI or a CQI of the any one piece of CSI.

According to the method, the terminal device may report channel state information with high transmission efficiency, to reduce reporting resources.

In a possible implementation, at least one column vector included in a precoding matrix corresponding to a PMI of the any one of the N pieces of CSI belongs to a precoding matrix corresponding to a PMI of first CSI, and the first CSI is CSI with a highest rank indicator in the N pieces of CSI.

According to the method, the terminal device needs to report only the precoding matrix corresponding to the PMI of the first CSI by using this manner, and the network device determines, based on the PMI of the first CSI, the precoding matrix corresponding to the PMI of the N pieces of CSI. This can reduce resources.

In a possible implementation, the N pieces of CSI include a $K1^{th}$ piece of CSI and a $K2^{th}$ piece of CSI, K1 and K2 are positive integers, K1 is less than K2, and an RI of the $K1^{th}$ piece of CSI is higher than or equal to an RI of the $K2^{th}$ piece of CSI.

In a possible implementation, the N pieces of CSI are sorted in descending order of N RIs in the N pieces of CSI.

In another possible implementation, the N pieces of CSI are carried in first information, and the first information further includes identification information of the N power offset values corresponding to the N pieces of CSI.

According to the method, the network device obtains the N pieces of CSI by using one piece of signaling. This can effectively reduce overheads of receiving information by the network device, and improve information transmission efficiency.

In still another possible implementation, the N pieces of CSI are sorted according to a predefined rule.

In still another possible implementation, that the N pieces of CSI are sorted according to a predefined rule includes: The N pieces of CSI include an $L1^{th}$ piece of CSI and an $L2^{th}$ piece of CSI, L1 and L2 are positive integers, L1 is less than L2, and a power offset value corresponding to the $L1^{th}$ piece of CSI is greater than a power offset value corresponding to the $L2^{th}$ piece of CSI.

In still another possible implementation, third indication information from the terminal device is received. The third indication information indicates location information of the CSI with the highest RI in the N pieces of CSI.

In still another possible implementation, the first indication information is carried in configuration information of a non-zero power channel state information reference signal NZP CSI-RS.

A third aspect of embodiments of this application discloses a communication apparatus. The apparatus may be a terminal device or a chip in a terminal device. The communication apparatus includes a transceiver unit and a processing unit. The transceiver unit is configured to receive first indication information from a network device. The first indication information indicates M power offset values of a reference signal resource, and M is an integer greater than or equal to 2. The processing unit is configured to determine, based on the M power offset values, M pieces of channel state information CSI corresponding to the reference signal resource. One power offset value corresponds to one of the M pieces of CSI. The transceiver unit is configured to send N pieces of CSI in the M pieces of CSI to the network device. N is a positive integer less than or equal to M.

In a possible implementation, N is a positive integer less than M.

In another possible implementation, N is a positive integer greater than or equal to 2 and less than M.

In still another possible implementation, the transceiver unit is further configured to receive second indication information from the network device. The second indication information indicates N power offset values corresponding to the N pieces of CSI.

In still another possible implementation, transmission efficiency of any one of the N pieces of CSI is higher than transmission efficiency of any one of (M-N) pieces of CSI, and the (M-N) pieces of CSI are CSI other than the N pieces of CSI in the M pieces of CSI. The transmission efficiency of the any piece of CSI is determined based on at least one of an RI or a CQI of the any piece of CSI.

In still another possible implementation, at least one column vector included in a precoding matrix corresponding to a PMI of the any one of the N pieces of CSI belongs to a precoding matrix corresponding to a PMI of first CSI, and the first CSI is CSI with a highest rank indicator in the N pieces of CSI.

In still another possible implementation, the N pieces of CSI include a K1$^{th}$ piece of CSI and a K2$^{th}$ piece of CSI, K1 and K2 are positive integers, K1 is less than K2, and an RI of the K1$^{th}$ piece of CSI is higher than or equal to an RI of the K2$^{th}$ piece of CSI.

In still another possible implementation, the N pieces of CSI are carried in first information, and the first information further includes identification information of the N power offset values corresponding to the N pieces of CSI.

In still another possible implementation, the N pieces of CSI are sorted according to a predefined rule.

In still another possible implementation, that the N pieces of CSI are sorted according to a predefined rule includes: The N pieces of CSI include an L1$^{th}$ piece of CSI and an L2$^{th}$ piece of CSI, L1 and L2 are positive integers, L1 is less than L2, and a power offset value corresponding to the L1$^{th}$ piece of CSI is greater than a power offset value corresponding to the L2$^{th}$ piece of CSI.

In still another possible implementation, the transceiver unit is further configured to send third indication information to the network device. The third indication information indicates location information of the CSI with the highest RI in the N pieces of CSI.

In still another possible implementation, the first indication information is carried in configuration information of a non-zero power channel state information reference signal NZP CSI-RS.

For technical effects brought by the third aspect or the possible implementations, refer to the descriptions of the technical effects brought by the first aspect or the corresponding implementations.

A fourth aspect of embodiments of this application discloses a communication apparatus. The apparatus may be a network device or a chip in a network device. The communication apparatus includes a transceiver unit and a processing unit. The transceiver unit is configured to send first indication information to a terminal device. The first indication information indicates M power offset values of a reference signal resource, and M is an integer greater than or equal to 2. The transceiver unit is configured to receive, from the terminal device, N pieces of CSI in M pieces of channel state information CSI corresponding to the reference signal resource. The M pieces of channel state information CSI corresponding to the reference signal resource are determined by the terminal device based on the M power offset values, one power offset value corresponds to one of the M pieces of CSI, and N is a positive integer less than or equal to M.

In a possible implementation, N is a positive integer less than M.

In another possible implementation, N is a positive integer greater than or equal to 2 and less than M.

In still another possible implementation, the transceiver unit is configured to send second indication information to the terminal device. The second indication information indicates N power offset values corresponding to the N pieces of CSI.

In still another possible implementation, transmission efficiency of any one of the N pieces of CSI is higher than transmission efficiency of any one of (M-N) pieces of CSI, and the (M-N) pieces of CSI are CSI other than the N pieces of CSI in the M pieces of CSI. The transmission efficiency of the any piece of CSI is determined based on at least one of an RI or a CQI of the any piece of CSI.

In still another possible implementation, at least one column vector included in a precoding matrix corresponding to a PMI of the any one of the N pieces of CSI belongs to a precoding matrix corresponding to a PMI of first CSI, and the first CSI is CSI with a highest rank indicator in the N pieces of CSI.

In still another possible implementation, the N pieces of CSI include a K1$^{th}$ piece of CSI and a K2$^{th}$ piece of CSI, K1 and K2 are positive integers, K1 is less than K2, and an RI of the K1$^{th}$ piece of CSI is higher than or equal to an RI of the K2$^{th}$ piece of CSI.

In still another possible implementation, the N pieces of CSI are carried in first information, and the first information further includes identification information of the N power offset values corresponding to the N pieces of CSI.

In still another possible implementation, the N pieces of CSI are sorted according to a predefined rule.

In still another possible implementation, that the N pieces of CSI are sorted according to a predefined rule includes: The N pieces of CSI include an L1$^{th}$ piece of CSI and an L2$^{th}$ piece of CSI, L1 and L2 are positive integers, L1 is less than L2, and a power offset value corresponding to the L1$^{th}$ piece of CSI is greater than a power offset value corresponding to the L2$^{th}$ piece of CSI.

In still another possible implementation, the transceiver unit is further configured to receive third indication information from the terminal device. The third indication information indicates location information of the CSI with the highest RI in the N pieces of CSI.

In still another possible implementation, the first indication information is carried in configuration information of a non-zero power channel state information reference signal NZP CSI-RS.

For technical effects brought by the fourth aspect or the possible implementations, refer to the descriptions of the technical effects brought by the second aspect or the corresponding implementations.

A fifth aspect of embodiments of this application discloses a communication apparatus, including a processor and an interface circuit. The interface circuit is configured to: receive a signal from a communication apparatus other than the communication apparatus, and transmit the signal to the processor, or send a signal from the processor to a communication apparatus other than the communication apparatus. The processor is configured to perform the following operations by using a logic circuit or executing code instructions:
  receiving first indication information from a network device by using the interface circuit, where the first indication information indicates M power offset values of a reference signal resource, and M is an integer greater than or equal to 2;
  determining, based on the M power offset values, M pieces of channel state information CSI corresponding to the reference signal resource, where one power offset value corresponds to one of the M pieces of CSI; and
  sending N pieces of CSI in the M pieces of CSI to the network device by using the interface circuit, where N is a positive integer less than or equal to M.

In a possible implementation, N is a positive integer less than M.

In another possible implementation, N is a positive integer greater than or equal to 2 and less than M.

In still another possible implementation, the processor is configured to receive second indication information from the network device by using the interface circuit. The second indication information indicates N power offset values corresponding to the N pieces of CSI.

In still another possible implementation, transmission efficiency of any one of the N pieces of CSI is higher than transmission efficiency of any one of (M-N) pieces of CSI, and the (M-N) pieces of CSI are CSI other than the N pieces of CSI in the M pieces of CSI. The transmission efficiency of the any piece of CSI is determined based on at least one of an RI or a CQI of the any piece of CSI.

In still another possible implementation, at least one column vector included in a precoding matrix corresponding to a PMI of the any one of the N pieces of CSI belongs to a precoding matrix corresponding to a PMI of first CSI, and the first CSI is CSI with a highest rank indicator in the N pieces of CSI.

In still another possible implementation, the N pieces of CSI include a K1$^{th}$ piece of CSI and a K2$^{th}$ piece of CSI, K1 and K2 are positive integers, K1 is less than K2, and an RI of the K1$^{th}$ piece of CSI is higher than or equal to an RI of the K2$^{th}$ piece of CSI.

In still another possible implementation, the N pieces of CSI are carried in first information, and the first information further includes identification information of the N power offset values corresponding to the N pieces of CSI.

In still another possible implementation, the N pieces of CSI are sorted according to a predefined rule.

In still another possible implementation, that the N pieces of CSI are sorted according to a predefined rule includes: The N pieces of CSI include an L1$^{th}$ piece of CSI and an L2$^{th}$ piece of CSI, L1 and L2 are positive integers, L1 is less than L2, and a power offset value corresponding to the L1$^{th}$ piece of CSI is greater than a power offset value corresponding to the L2$^{th}$ piece of CSI.

In still another possible implementation, the processor is configured to send third indication information to the network device by using the interface circuit. The third indication information indicates location information of the CSI with the highest RI in the N pieces of CSI.

In still another possible implementation, the first indication information is carried in configuration information of a non-zero power channel state information reference signal NZP CSI-RS.

For technical effects brought by the fifth aspect or the possible implementations, refer to the descriptions of the technical effects brought by the first aspect or the corresponding implementations.

A sixth aspect of embodiments of this application discloses a communication apparatus, including a processor and an interface circuit. The interface circuit is configured to: receive a signal from a communication apparatus other than the communication apparatus, and transmit the signal to the processor, or send a signal from the processor to a communication apparatus other than the communication apparatus. The processor is configured to perform the following operations by using a logic circuit or executing code instructions:

sending first indication information to a terminal device by using the interface circuit, where the first indication information indicates M power offset values of a reference signal resource, and M is an integer greater than or equal to 2; and receiving, from the terminal device by using the interface circuit, N pieces of CSI in M pieces of channel state information CSI corresponding to the reference signal resource, where the M pieces of channel state information CSI corresponding to the reference signal resource are determined by the terminal device based on the M power offset values, one power offset value corresponds to one of the M pieces of CSI, and N is a positive integer less than or equal to M.

In a possible implementation, N is a positive integer less than M.

In another possible implementation, N is a positive integer greater than or equal to 2 and less than M.

In still another possible implementation, the processor is configured to send second indication information to the terminal device by using the interface circuit. The second indication information indicates N power offset values corresponding to the N pieces of CSI.

In still another possible implementation, transmission efficiency of any one of the N pieces of CSI is higher than transmission efficiency of any one of (M-N) pieces of CSI, and the (M-N) pieces of CSI are CSI other than the N pieces of CSI in the M pieces of CSI. The transmission efficiency of the any piece of CSI is determined based on at least one of an RI or a CQI of the any piece of CSI.

In still another possible implementation, at least one column vector included in a precoding matrix corresponding to a PMI of the any one of the N pieces of CSI belongs to a precoding matrix corresponding to a PMI of first CSI, and the first CSI is CSI with a highest rank indicator in the N pieces of CSI.

In still another possible implementation, the N pieces of CSI include a K1$^{th}$ piece of CSI and a K2$^{th}$ piece of CSI, K1 and K2 are positive integers, K1 is less than K2, and an RI of the K1$^{th}$ piece of CSI is higher than or equal to an RI of the K2$^{th}$ piece of CSI.

In still another possible implementation, the N pieces of CSI are carried in first information, and the first information further includes identification information of the N power offset values corresponding to the N pieces of CSI.

In still another possible implementation, the N pieces of CSI are sorted according to a predefined rule.

In still another possible implementation, that the N pieces of CSI are sorted according to a predefined rule includes: The N pieces of CSI include an L1$^{th}$ piece of CSI and an L2$^{th}$ piece of CSI, L1 and L2 are positive integers, L1 is less than L2, and a power offset value corresponding to the L1$^{th}$ piece of CSI is greater than a power offset value corresponding to the L2$^{th}$ piece of CSI.

In still another possible implementation, the processor is configured to receive third indication information from the terminal device by using the interface circuit. The third indication information indicates location information of the CSI with the highest RI in the N pieces of CSI.

In still another possible implementation, the first indication information is carried in configuration information of a non-zero power channel state information reference signal NZP CSI-RS.

For technical effects brought by the sixth aspect or the possible implementations, refer to the descriptions of the technical effects brought by the second aspect or the corresponding implementations.

A seventh aspect of embodiments of this application discloses a chip system. The chip system includes at least one processor and an interface circuit, and the at least one processor is configured to execute a computer program or instructions, to implement the method according to any one of the foregoing aspects.

An eighth aspect of embodiments of this application discloses a computer-readable storage medium. The computer-readable storage medium stores computer instructions, and when the computer instructions are run on a processor, the method according to any one of the foregoing aspects is implemented.

A ninth aspect of embodiments of this application discloses a computer program product. The computer program product includes computer program code, and when the computer program code is run on a computer, the method according to any one of the foregoing aspects is implemented.

BRIEF DESCRIPTION OF THE DRAWINGS

The following describes accompanying drawings used in embodiments of this application.

DETAILED DESCRIPTION OF ILLUSTRATIVE EMBODIMENTS

The following describes embodiments of this application with reference to the accompanying drawings in embodiments of this application.

Figure 1:
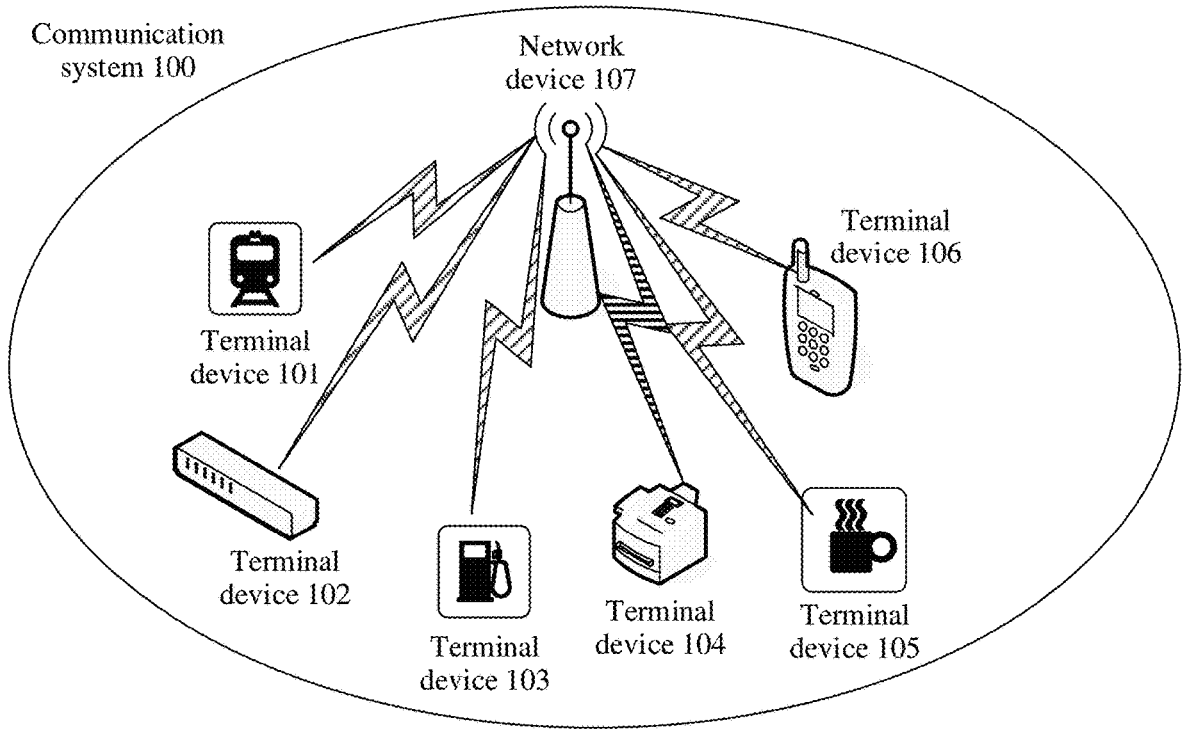
FIG. 1 is a schematic diagram of a structure of a communication system according to an embodiment of this application.

FIG. 1 is a schematic diagram of a structure of a communication system 100 according to an embodiment of this application. The communication system 100 may include a network device 107, a terminal device 101, a terminal device 102, a terminal device 103, a terminal device 104, a terminal device 105, and a terminal device 106. It should be understood that the communication system 100 to which the method in embodiments of this application may be applied may include more network devices and/or fewer terminal devices. The network device and the terminal device may be hardware, may be software obtained through functional division, or may be a combination thereof. The network device and the terminal device may communicate with each other by using another device or network element. The method in embodiments of this application may be applied to the communication system 100 shown in FIG. 1.

(1) The terminal device includes a device that provides a voice and/or data connectivity for a user. Specifically, the terminal device includes a device that provides a voice for the user, includes a device that provides data connectivity for the user, or includes a device that provides a voice and data connectivity for the user. For example, the terminal device may include a handheld device having a wireless connection function, or a processing device connected to a wireless modem. The terminal device may communicate with a core network through a radio access network (RAN), and exchange a voice or data with the RAN, or exchange a voice and data with the RAN. The terminal device may include user equipment (UE), a wireless terminal device, a mobile terminal device, a device-to-device (D2D) terminal device, a vehicle-to-everything (V2X) terminal device, a machine-to-machine/machine-type communication (M2M/MTC) terminal device, an internet of things (IoT) terminal device, light user equipment (light UE), reduced capability user equipment (REDCAP UE), a subscriber unit, a subscriber station, a mobile station, a remote station, an access point (AP), a remote terminal, an access terminal, a user terminal, a user agent, a user device, or the like. For example, the terminal device may include a mobile phone (or referred to as a "cellular" phone), a computer having a mobile terminal device, or a portable, pocket-sized, handheld, or computer built-in mobile apparatus. For example, the terminal device may be a device such as a personal communication service (PCS) phone, a cordless telephone set, a session initiation protocol (SIP) phone, a wireless local loop (WLL) station, or a personal digital assistant (PDA). The terminal device may alternatively include a limited device, for example, a device with low power consumption, a device with a limited storage capability, or a device with a limited computing capability. For example, the terminal includes an information sensing device such as a barcode, radio frequency identification (RFID), a sensor, a global positioning system (GPS), or a laser scanner.

By way of example, and not limitation, in embodiments of this application, the terminal device may alternatively be a wearable device. The wearable device may also be referred to as a wearable intelligent device, an intelligent wearable device, or the like, and is a general term of wearable devices that are intelligently designed and developed for daily wear by using a wearable technology, for example, glasses, gloves, watches, clothes, and shoes. The wearable device is a portable device that can be directly worn on the body or integrated into clothes or an accessory of a user. The wearable device is not only a hardware device, but also implements a powerful function through software support, data exchange, and cloud interaction. In a broad sense, wearable intelligent devices include full-featured and large-sized devices that can implement all or some of functions without depending on smartphones, for example, smart watches or smart glasses, and include devices that dedicated to only one type of application function and need to collaboratively work with other devices such as smartphones, for example, various smart bands, smart helmets, or smart jewelry for monitoring physical signs.

If the various terminal devices described above are located in a vehicle (for example, placed in the vehicle or installed in the vehicle), the terminal devices may be all considered as vehicle-mounted terminal devices. For example, the vehicle-mounted terminal devices are also referred to as on-board units (OBU).

In this embodiment of this application, the terminal device may further include a relay (relay). Alternatively, it may be understood that all devices that can perform data communication with the base station may be considered as terminal devices.

(2) The network device includes, for example, an access network (access network, AN) device such as a base station (for example, an access point), and may be a device that is in an access network and that communicates with a wireless terminal device over an air interface through one or more cells. Alternatively, the network device is, for example, a road side unit (RSU) in a vehicle-to-everything (V2X) technology. The base station may be configured to perform mutual conversion between a received over-the-air frame and an IP packet, and serve as a router between the terminal device and a remaining part of the access network. The remaining part of the access network may include an IP network. The RSU may be a fixed infrastructure entity supporting a V2X application, and may exchange a message with another entity supporting the V2X application. The network device may further coordinate attribute management of the air interface. For example, the network device may include an evolved NodeB (NodeB, eNB, or e-NodeB) in a long term evolution (LTE) system or a long term evolution-advanced (LTE-A) system, may include a next generation NodeB (gNB) in the 5th generation (5G) mobile communication technology NR system (also briefly referred to as an NR system), or may include a central unit (CU) and a distributed unit (DU) in a cloud radio access network (Cloud RAN) system. This is not limited in embodiments of this application.

Some terms in this application are first described, to help a person skilled in the art have a better understanding.

(1) Synchronization signal/physical broadcast channel block (SSB): The SSB includes at least one of a primary synchronization signal (PSS), a secondary synchronization signal (SSS), and a physical broadcast channel (PBCH). The SSB is a signal mainly used for cell searching, cell synchronization, and carrying broadcast information.

(2) Channel state information (CSI): When a signal is transmitted from a transmit end to a receive end through a wireless channel, the signal fades due to possible scattering, reflection, and energy attenuation over distance. The CSI is used to characterize the wireless channel, and may include at least one of a channel quality indicator (CQI), a precoding matrix indicator (PMI), a CSI-RS resource indicator (CRI), an SSB resource indicator (SSBRI), a layer indicator (LI), a rank indicator (RI), L1-reference signal received power (RSRP), and an L1-signal to interference plus noise ratio (SINR). The CSI may be sent by the terminal device to the network device through a physical uplink control channel (PUCCH) or a physical uplink shared channel (PUSCH).

(3) CSI report: One CSI report indicates the terminal device to feed back one piece of CSI, that is, CSI in one frequency band, one transmission assumption, and one reporting mode. Generally, different CSI reports may be associated with different frequency bands. In this way, the terminal device may feed back CSI on different frequency bands based on the different CSI reports. The different CSI reports may alternatively be associated with one frequency band, but with different transmission assumptions. For example, both a CSI report 1 and a CSI report 2 are associated with a first frequency band, but the CSI report 1 is associated with two interference measurement resources. It indicates that CSI in the CSI report 1 corresponds to a subsequent transmission assumption. In this assumption, transmission on the first frequency band has two pieces of interference. The CSI report 2 is associated with five interference measurement resources, and it indicates that CSI in the CSI report 2 corresponds to another subsequent transmission assumption. In this assumption, transmission on the first frequency band has five pieces of interference. Generally, one CSI report is associated with one reference signal resource used for channel measurement, or may be associated with one or more reference signal resources used for interference measurement. One CSI report also corresponds to one transmission resource, that is, a time-frequency resource used by the terminal device to send CSI.

(4) A reference signal is a known signal provided by a transmit end to a receive end for channel estimation or channel sounding. In this embodiment of this application, the reference signal may be used for channel measurement, interference measurement, and the like, for example, measuring parameters such as reference signal received quality (RSRQ), a signal-to-noise ratio (SNR), an SINR, a CQI, and a PMI.

(5) A reference signal resource includes at least one of resources such as a time-frequency resource, an antenna port, a power resource, and a scrambling code of a reference signal. The network device may send the reference signal to the terminal device based on the reference signal resource. Correspondingly, the terminal device may receive the reference signal based on the reference signal resource.

The reference signal in embodiments of this application may include one or more of the following reference signals: a channel state information reference signal (CSI-RS), an SSB, or a sounding reference signal (SRS). Correspondingly, the reference signal resource may include a CSI-RS resource, an SSB resource, or an SRS resource. In some cases, the SSB may alternatively refer to the SSB resource.

(6) Power offset value and power assumption: The terminal device determines CSI based on a measurement result of a reference signal and reports the CSI to the base station. However, because the CSI is used to assist the network device in determining a link parameter for downlink data transmission, and data transmission and reference signal transmission may have different transmit power (or power spectral densities), the CSI set and obtained by the terminal device through direct calculation based on the measurement result of the reference signal is not necessarily completely aligned with CSI corresponding to data transmission. Currently, a power offset value parameter is introduced in a standard, and indicates a power ratio of data transmission to reference signal transmission, and is usually represented in decibel (dB). A larger value indicates a larger ratio of a power spectral density of data transmission to a power spectral density of a reference signal. The parameter is usually directly indicated in a configuration parameter of the reference signal. The terminal device adjusts and estimates channel quality of data transmission based on the parameter and a measurement result of the reference signal, and then calculates CSI of data transmission and feeds back the CSI to the network device. Because the power offset value is not necessarily power that is actually used when the network device performs data transmission, and is only an alignment assumption of data transmission power between the network device and the terminal device, the power offset value may also be referred to as a power assumption. For example, a power offset value may be an assumption of a ratio of energy per resource element (EPRE) on a physical downlink shared channel (PDSCH) to an EPRE of an NZP CSI-RS, and a unit may be a decibel value (dB) or a linear value.

In the communication system, the terminal device obtains CSI through measurement based on channel quality of a reference signal, and then sends the CSI to the network device. Correspondingly, the network device receives the CSI from the terminal device, and schedules the terminal device based on the channel state information. The following is an example of configuration information of a non-zero power channel state information reference signal (non zero power channel state information reference signal, NZP CSI-RS). The network device may indicate the configuration information of the NZP CSI-RS by sending radio resource control (RRC) signaling to the terminal device. The configuration information mainly includes the following parameters: a resource mapping (resourceMapping) configuration, a power control offset (powerControlOffset), a synchronization signal power control offset (powerControlOffsetSS), a scrambling identifier (scramblingID), a periodicity and offset (periodicityAndOffset) configuration, and a quasi colocation configuration (qcl-InfoPeriodicCSI-RS). powerControlOffset is an assumed power offset of the PDSCH EPRE relative to the EPRE of the NZP CSI-RS, and powerControlOffsetSS is an assumed power offset of the EPRE of the NZP CSI-RS relative to the EPRE of the synchronization signal (synchronization signal, SS). The terminal device determines CSI based on powerControlOffset, and then sends the CSI to the network device. Correspondingly, the network device receives the CSI from the terminal device, and schedules data based on the CSI. In an actual data transmission process, to reduce energy consumption, the network device may reduce transmit power of a signal such as data, that is, flexibly adjust the transmit power of the signal such as data. Because a reference signal resource corresponds only to one power offset value powerControlOffset, and the power offset value powerControlOffset corresponds only to one transmit power of the signal such as data, the transmit power dynamically adjusted by the network device based on an actual energy consumption reduction requirement may not be adapted. In this case, the network device cannot obtain CSI transmitted at actually adjusted transmit power of the signal such as data, that is, the network device cannot obtain CSI corresponding to actual transmit power, and therefore cannot perform accurate link adaptation. Consequently, performance of the communication system is greatly reduced. Therefore, to resolve the foregoing problem, embodiments of this application provide the following solutions.

Figure 2:
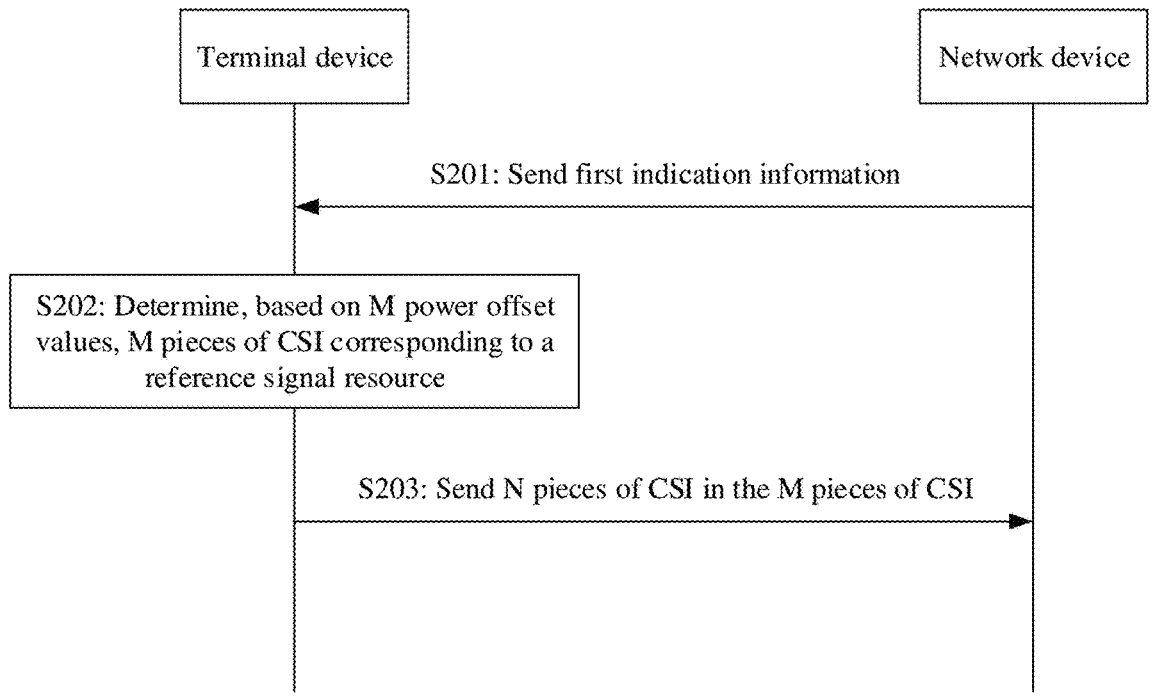
FIG. 2 is a schematic flowchart of a communication method according to an embodiment of this application.

FIG. 2 shows a communication method according to an embodiment of this application. The method includes but is not limited to the following steps.

Step S201: A network device sends first indication information to a terminal device. Accordingly, the terminal device receives the first indication information from the network device.

Specifically, the first indication information indicates M power offset values of a reference signal resource, and M is an integer greater than or equal to 2. The following uses three manners as examples to describe a method for indicating the M power offset values by using the first indication information.

Method A: Optionally, the first indication information may be carried in RRC signaling, a media access control (MAC) control element (CE), or downlink control information (DCI). The following uses an example in which the reference signal resource is an NZP-CSI-RS resource for description. However, the reference signal resource provided in this application is not limited to the NZP-CSI-RS resource.

Optionally, the reference signal resource may be an NZP-CSI-RS resource. In this case, further optionally, the first indication information may be carried in configuration information of an NZP CSI-RS, or in other words, the first indication information may be included in configuration information of an NZP CSI-RS. For example, one or more information elements (information element, IE) newly added to an RRC message indicate different power offset values. The following is an example of an IE added to the configuration information of the NZP CSI-RS of the RRC when M is 2:

```
NZP-CSI-RS resource NZP-CSI-RS-Resource ::=            Sequence SEQUENCE {
NZP-CSI-RS resource identifier nzp-CSI-RS-ResourceId   NZP-CSI-RS-ResourceId,
Resource mapping resourceMapping                       CSI-RS resource mapping
                                                       CSI-RS-ResourceMapping,
Frequency offset value powerControlOffset              INTEGER (-8..15),
Frequency offset value 1 powerControlOffset1           INTEGER (-8..15),
Synchronization signal power offset value              ENUMERATED {dB-3, dB0,
powerControlOffsetSS                                   dB3, dB6}
                                                       OPTIONAL,   -- Need R
Scrambling identifier scramblingID                     ScramblingId,
Periodicity and offset configuration periodicityAndOffset  CSI-
                                                       ResourcePeriodicityAndOffset
                                                       OPTIONAL,   -- Cond
                                                       PeriodicOrSemiPersistent
Quasi co-location configuration qcl-InfoPeriodicCSI-RS TCI-StateId
                                                       OPTIONAL,   -- Cond
                                                       Periodic
...
}
```

Two power offset values are respectively powerControlOffset and powerControlOffset1. It should be understood that the foregoing is an example, and a name of an IE of the power offset value and signaling carried in the power offset value are not limited in this application.

Optionally, the M power offset values may be determined based on one power offset value and M power back-off values, and the M power back-off values may be predefined, or indicated by signaling. For example, an $m^{th}$ power offset value is determined based on the power offset value and an $m^{th}$ power back-off value, and m is a positive integer less than or equal to M. For example, it is assumed that the power offset value is x dB, and the the $m^{th}$ power back-off value is sequentially $a_m$ dB, the corresponding the $m^{th}$ power back-off value is $(x-a_m)$ dB.

Optionally, the M power back-off values are equally spaced or evenly distributed. That is, a difference between every two adjacent power back-off values is equal. For example, the M power back-off values meet $a_{m+1}-a_m=a_m-a_{m-1}$, and m is a positive integer greater than or equal to 2 and less than or equal to (M−1).

Optionally, a maximum value of the M power back-off values does not exceed X, and X is determined based on capability information reported by the terminal device. For example, it is assumed that M is 2, a power offset value of the reference signal resource indicated by the first indication information is powerControlOffset, a power offset value corresponding to a power back-off value powerbackOffset1 may be a difference between powerControlOffset and powerbackOffset1, and a power offset value corresponding to a power back-off value powerbackOffset2 may be a difference between powerControlOffset and powerbackOffset2.

Optionally, the M power offset values may be determined based on one power offset value and (M−1) power back-off values, and the (M−1) power back-off values may be predefined, or indicated by signaling. For example, a first power offset value in the M power offset values is equal to the power offset value, an $m^{th}$ power offset value is determined based on the power offset value and a $(m-1)^{th}$ power back-off value, and m is a positive integer greater than or equal to 2 and less than or equal to M. For example, M is 3, that is, a quantity of power offset values is 3. In this case, a quantity of power back-off values is 2. One power offset value indicated by the network device is powerControlOffset, and two power back-off values are respectively powerbackOffset1 and powerbackOffset2. In this case, the first power offset value is powerControlOffset, the second power offset value is powerControlOffset1=powerControlOffset−powerbackOffset1, and the third power offset value is powerControlOffset2=powerControlOffset−powerbackOffset2.

Method B: The first indication information is carried in a CSI reporting configuration (CSI-ReportConfig) of RRC signaling. Optionally, in addition to the configuration information of the NZP CSI-RS, the one or more power back-off values may be carried in configuration information of one CSI report, and the N pieces of CSI may be reported in the CSI report. For example, the following is an example of an IE added to CSI-ReportConfig of the RRC:

```
CSI-ReportConfig ::=            SEQUENCE {
    reportQuantity                  CHOICE {
        none                        NULL,
        cri-RI-PMI-CQI                  NULL,
        cri-RI-i1                       NULL,
        cri-RI-i1-CQI                   SEQUENCE {
            pdsch-BundleSizeForCSI          ENUMERATED {n2, n4}
OPTIONAL   -- Need S
        },
        cri-RI-CQI                      NULL,
        cri-RSRP                        NULL,
        ssb-Index-RSRP                  NULL,
        cri-RI-LI-PMI-CQI               NULL
    cri-RI-Mpow-LI-PMI-CQI                      ENUMERATED
{offset1, offset2, offset3, offset4}
    },
}
```

In other words, in the CSI reporting configuration, the first indication information is a field of reporting quantity, for example, cri-RI-Mpow-LI-PMI-CQI, and the field simultaneously indicates a plurality of power offset values {offset1, offset2, offset3, offset4}. For configurations of the plurality of power offset values, refer to the description of the method A.

Method C: The network device sends a CSI reporting configuration to the terminal device. The CSI reporting configuration is associated with a CSI resource configuration (CSI-ResourceConfig). The resource configuration includes a CSI-reference signal resource set CSI-ResourceSet, and the set includes a group of CSI resources, for example, may be the NZP-CSI-RS resources. If ResourceSet is configured with a repetition field being off or a third state other than on and off, the group of resources may indicate different power offset values, that is, the first indication information is carried on the group of resources. The group of resources may have a same configuration except for different power offset values. The terminal device feeds back, in a same CSI report, a measurement result of each resource in the group of resources based on the CSI reporting configuration. In this way, CSI of different power offset values is reported.

Method D: The network device sends M CSI reporting configurations to the terminal device. Each of the M CSI reporting configurations is associated with one CSI resource configuration, the resource configuration is associated with one ResourceSet, and the set includes a group of CSI resources. The group of CSI resources may have only one resource, or CSI is fed back based on only one resource in the group of resources (the repetition field is on). Therefore, there are M resources in total. Different resources corresponding to the M CSI reporting configurations indicate different power offset values, that is, the first indication information is carried on the M resources. If the M CSI reporting configurations indicate a same PUCCH reporting resource, the terminal device may report measurement results of the M resources in a same CSI report feedback resource.

For configuration manners of the M different power offset values in the method B, the method C, and the method D, refer to the method A.

Step S202: The terminal device determines, based on the M power offset values, M pieces of CSI corresponding to the reference signal resource.

One power offset value corresponds to one of the M pieces of CSI. In an example, it is assumed that M is 2, and the terminal device determines, based on two power offset values, two pieces of CSI corresponding to the reference signal.

A process of determining the CSI by the terminal device may also be understood as a process of calculating the CSI by the terminal device. Specifically, an $m^{th}$ piece of CSI is used as an example. The terminal device performs channel measurement based on the NZP CSI-RS to obtain a measurement value of an equivalent channel matrix for NZP-CSI-RS transmission, then determines a measurement value of an equivalent channel matrix for $m^{th}$ data transmission based on an $m^{th}$ power offset value, and finally calculates the $m^{th}$ piece of CSI based on the measurement value of the equivalent channel matrix for $m^{th}$ data transmission. Optionally, a ratio of an element in the measurement value of the equivalent channel matrix for $m^{th}$ data transmission to a corresponding element in the measurement value of the equivalent channel matrix for NZP-CSI-RS transmission is equal to a root mean square of the $m^{th}$ power offset value.

In an optional manner, the terminal device determines the CSI corresponding to the M power offset values, or the terminal device calculates the CSI corresponding to the M power offset values.

In another optional manner, the terminal device does not need to determine CSI corresponding to each of the M power offset values, and only needs to determine CSI corresponding to some of the M power offset values.

When the terminal device determines the CSI corresponding to some of the M power offset values, in an optional embodiment, the network device may further send N power offset values to the terminal device, so that the terminal device determines CSI corresponding to the N power offset values in the M power offset values, and N is a positive integer less than M.

Step S203: The terminal device sends N pieces of CSI in the M pieces of CSI to the network device. Correspondingly, the network device receives the N pieces of CSI reported by the terminal device.

Specifically, N is a positive integer less than or equal to M. Each of the M pieces of CSI includes at least one of an RI, a PMI, or a channel quality indicator.

In an optional manner, the N pieces of CSI may be separately reported in N CSI reports. In another optional manner, the N pieces of CSI may alternatively be reported in one CSI report. In this case, it may also be understood that the N pieces of CSI are reported on one time-frequency resource.

When N is equal to M, the terminal device sends all of the M pieces of CSI to the network device. When N is less than M, the terminal device sends some of the M pieces of CSI to the network device. N may be indicated by the network device, predefined, or reported by the terminal device.

When N is less than M, the following provides several possible manners of determining the N pieces of CSI in the M pieces of CSI by the terminal device.

Manner 1: The terminal device may receive second indication information from the network device. The second indication information indicates the N power offsets corresponding to the N pieces of CSI. Correspondingly, the terminal device sends, to the network device, the N pieces of CSI corresponding to the N power offsets. The network device indicates some of the M power offset values by using signaling, so that the terminal device and the network device align CSI to be transmitted. For example, the network device transmits the first indication information by using one information element in the configuration information of the reference signal resource, the first indication information is RRC signaling or an information element in RRC signaling, and a value change delay of the first indication information is relatively long, that is, a change delay of the M power offset values is relatively long. The network device transmits the second indication information based on a MAC CE or DCI, and a value change delay of the second indication information is relatively short, so that the N power offset values can be flexibly and quickly indicated in the M configured power offset values.

Manner 2: The N pieces of CSI are determined based on transmission efficiency. The terminal device determines the N pieces of CSI based on transmission efficiency of the CSI corresponding to the M power offset values. The N pieces of CSI correspond to N power offset values in the M power offset values. The N pieces of CSI are first N pieces of CSI with relatively high transmission efficiency in the M pieces of CSI. For example, transmission efficiency of any one of the N pieces of CSI is higher than transmission efficiency of any one of the (M-N) pieces of CSI, and the (M-N) pieces of CSI are CSI other than the N pieces of CSI in the M pieces of CSI. In other words, the N pieces of CSI with highest transmission efficiency are selected for reporting. The parameter N may be predefined, or may be pre-indicated by the network device, or may be determined by the terminal device and then reported to the network device.

Manner 3: The N pieces of CSI are determined based on transmission efficiency and a preset threshold. The N pieces of CSI are N pieces of CSI whose transmission efficiency is higher than a preset threshold in the M pieces of CSI. Optionally, N is a fixed value, or a value of N changes as a value relationship between transmission efficiency of the M pieces of CSI and a preset threshold changes, and the terminal device needs to report a value of N to the network device.

In manner 2 and manner 3, for one piece of CSI, transmission efficiency of the CSI is determined based on at least one of an RI or a CQI of the CSI. For example, the transmission efficiency is an information quantity that can be transmitted by the network device on a time-frequency resource unit, for example, a quantity of information bits. Optionally, when the information to be transmitted is CSI, the transmission efficiency may be equal to RI×Q×R, RI is an RI reported by using the CSI, and Q and R are a modulation order and a code rate that correspond to a CQI reported by using the CSI.

In an example, it is assumed that M=4, that is, there are four pieces of CSI: the first piece of CSI, the second piece of CSI, the third piece of CSI, and the fourth piece of CSI. Transmission efficiency corresponding to the four pieces of CSI is respectively 50%, 80%, 75%, and 72%. It is assumed that the predefined threshold is 60%. Because the transmission efficiency corresponding to the first piece of CSI is 50%, which is less than the predefined threshold 60%, the terminal device determines three pieces of CSI in the four pieces of CSI: the second piece of CSI, the third piece of CSI, and the fourth piece of CSI, and sends the three pieces of CSI to the network device.

In manner 2 and manner 3, the N pieces of CSI are not determined by the terminal device based on the N power offset values indicated by the network device, but are determined independently by the terminal device. Therefore, in an optional manner, the terminal device may further report identification information of the N power offset values corresponding to the N pieces of CSI. Optionally, the identification information of the N power offset values corresponding to the N pieces of CSI may be reported to the network device together with the N pieces of CSI. For example, the N pieces of CSI are carried in first information, and the first information further includes the identification information of the N power offset values corresponding to the N pieces of CSI. The N pieces of CSI and the identification information of the N power offset values corresponding to the N pieces of CSI may be encapsulated together for reporting, or may be separately reported. This is not limited in this embodiment of this application. For example, the N pieces of CSI and the identification information of the N power offset values corresponding to the N pieces of CSI are separately reported. The terminal device may separately perform coding and modulation on the N pieces of CSI and the N pieces of power offset value information corresponding to the N pieces of CSI, to obtain two modulated symbol streams, and then send the two modulated symbol streams at different locations on one time-frequency resource. For another example, the N pieces of CSI and the identification information of the N power offset values corresponding to the N pieces of CSI are encapsulated together for reporting. The terminal device may perform joint coding and modulation on the N pieces of CSI and the N pieces of power offset value information corresponding to the N pieces of CSI, to obtain one modulated symbol stream, and then send the modulated symbol stream on one time-frequency resource. One piece of CSI is used as an example, the terminal device may connect the CSI and information bits of power offset value information corresponding to the CSI in series, which is considered as one "complete CSI", and then perform joint transmission of the N pieces of "complete CSI".

In a possible implementation, at least one column vector included in a precoding matrix corresponding to a PMI of the any one of the N pieces of CSI belongs to a precoding matrix corresponding to a PMI of first CSI, and the first CSI is CSI with a highest rank indicator in the N pieces of CSI. That is, there is an association relationship between N precoding matrices corresponding to PMIs of the N pieces of CSI. Optionally, when the N pieces of CSI are reported in a same CSI report, the first CSI includes PMI information, and the terminal device does not report PMIs of (N−1) pieces of CSI, or the terminal device reports column information of the PMI in the precoding matrix corresponding to the PMI of the first CSI. It should be understood that when the terminal device reports the N pieces of CSI, the N pieces of CSI include the PMI of the first CSI, and do not include the PMI of the other CSI. When the network device receives the N pieces of CSI, the PMIs of the (N−1) pieces of CSI other than the first CSI are determined based on the PMI of the first CSI.

This is because, for a same measurement resource, a change of the power offset value has slight impact on a PMI measurement result, and has great impact on a CQI measurement result. When a rank of the PMI in the first CSI is the highest, ranks of PMIs in other CSI are all less than a rank of a PMI corresponding to the PMI in the first CSI. The precoding matrix corresponding to the PMI of the first CSI may include a precoding matrix corresponding to the PMI of the other CSI. Therefore, the terminal device does not need to report the PMI of each piece of CSI, and the terminal device reports the PMI of the first CSI instead of the PMI of the other CSI, or the terminal device reports the PMI of the first CSI and a column that corresponds to the other CSI and that is in the precoding matrix corresponding to the PMI of the other CSI, so that the network device can accurately restore PMIs of the plurality of CSIs based on the PMI of the first CSI. Therefore, to reduce signaling overheads, only the first CSI in the N pieces of CSI may be used to feed back the PMI, and reporting of the PMIs of the (N−1) pieces of CSI may be omitted, or fewer bits are used to indicate reporting of the PMI.

For example, the first CSI corresponds to a first precoding matrix, and the first precoding matrix includes X columns, and the X columns are predetermined and are obtained in the precoding matrix corresponding to the PMI of the other CSI.

In an example, it is assumed that N is 2, RIs of the two pieces of CSI are respectively RI=4 and RI=1, and CSI with highest rank indicator RI=4 is first CSI. In this case, a precoding matrix corresponding to a PMI of the first CSI is:

$$B_0 = [v_0 \ v_1 \ \ldots \ v_{r-1}] = \begin{bmatrix} a_{0,0} & a_{0,1} & \ldots & a_{0,r-1} \\ a_{1,0} & a_{1,1} & \ldots & a_{1,r-1} \\ \ldots & \ldots & \ldots & \ldots \\ a_{s-1,0} & a_{s-1,1} & \ldots & a_{s-1,r-1} \end{bmatrix},$$

where
r=4, and s is greater than or equal to 2. CSI with rank indicator RI=1 is second CSI, and therefore, a precoding matrix corresponding to a PMI of the second CSI may be considered by default as a column vector in the first column in the precoding matrix $B_0$ corresponding to the PMI of the first CSI. That is, the precoding matrix corresponding to the PMI of the second CSI is:

$$B_1 = [v_0] = \begin{bmatrix} a_{0,0} \\ a_{1,0} \\ \ldots \\ a_{s-1,0} \end{bmatrix}.$$

s is greater than or equal to 2. Alternatively, the precoding matrix corresponding to the PMI of the second CSI may be indicated by using 2-bit indication information. For example, if the first indication information indicates 00, it indicates that the precoding matrix corresponding to the PMI of the second CSI is the first column vector in the precoding matrix corresponding to the PMI of the first CSI. For example, if the first indication information indicates 01, it indicates that the precoding matrix corresponding to the PMI of the second CSI is the second column vector in the precoding matrix corresponding to the PMI of the first CSI. For example, if the first indication information indicates 10, it indicates that the precoding matrix corresponding to the PMI of the second CSI is the third column vector in the precoding matrix corresponding to the PMI of the first CSI. For example, if the first indication information indicates 11, it indicates that the precoding matrix corresponding to the PMI of the second CSI is the fourth column vector in the precoding matrix corresponding to the PMI of the first CSI.

The terminal device sends the N pieces of CSI to the network device. The following provides several possible examples of a sorting manner of the N pieces of CSI.

Manner A: The N pieces of CSI are sorted in descending order of the N RIs in the N pieces of CSI. In other words, the N pieces of CSI include a $K1^{th}$ piece of CSI and a $K2^{th}$ piece of CSI, K1 and K2 are positive integers, K1 is less than K2, and an RI of the $K1^{th}$ piece of CSI is higher than or equal to an RI of the $K2^{th}$ piece of CSI.

In an example, it is assumed that N=4, four power offset values are 0 dB, 1 dB, 2 dB, and 3 dB, identification information of the four power offset values is sequentially P(00), P(01), P(10), and P(11), and RIs of four pieces of CSI corresponding to the four power offset values are respectively RI=2, RI=3, RI=4, and RI=3, the four pieces of CSI are sorted in descending order of RIs to obtain the first information, the first information includes the four pieces of CSI and identification information of the four power offset values corresponding to the four pieces of CSI. Details are shown in Table 1.

TABLE 1

| | CSI field |
|---|---|
| CSI reporting | CSI corresponding to the 2 dB power offset value (RI = 4), P(10) |
| | CSI corresponding to the 1 dB power offset value (RI = 3), P(01) |
| | CSI corresponding to the 3 dB power offset value (RI = 3), P(11) |
| | CSI corresponding to the 0 dB power offset value (RI = 2), P(00) |

Manner B: The N pieces of CSI are sorted according to a predefined rule.

The predefined rule includes sorting in descending order of the N power offset values corresponding to the N pieces of CSI, that is, the N pieces of CSI include an $L1^{th}$ piece of CSI and an $L2^{th}$ piece of CSI, and L1 and L2 are positive integers. When L1 is less than L2, a power offset value corresponding to the $L1^{th}$ piece of CSI is greater than a power offset value corresponding to the $L2^{th}$ piece of CSI.

The predefined rule includes sorting in ascending order of the N power offset values corresponding to the N pieces of CSI, that is, the N pieces of CSI include an $S1^{th}$ piece of CSI and an $S2^{th}$ piece of CSI, and S1 and S2 are positive integers. When S1 is less than S2, a power offset value corresponding to the S1$^{th}$ piece of CSI is less than a power offset value corresponding to the S2$^{th}$ piece of CSI.

The predefined rule includes sorting in an order indicated by the N power offset values corresponding to the N pieces of CSI in the first indication information, or sorting in an order indicated by N power back-off values in the first indication information.

The N pieces of CSI and location information of the CSI with the highest RI in the N pieces of CSI may be encapsulated together for reporting. For example, the N pieces of CSI are carried in second information, and the second information further includes the location information of the CSI with the highest RI in the N pieces of CSI. The location information of the CSI with the highest RI is reported because the CSI with the highest RI in the N pieces of reported CSI includes the PMI, and the other CSI may not include or may not explicitly include the PMI. A manner of obtaining the PMI from the (N−1) pieces of CSI may be extracting a corresponding column from a precoding matrix corresponding to a PMI with a highest RI according to a predefined rule or based on indication information. Certainly, the N pieces of CSI and the location information of the CSI with the highest RI in the N pieces of CSI may be separately reported. For example, the N pieces of CSI are carried in third information, and the terminal device sends the third indication information to the network device. The third indication information indicates the location information of the CSI with the highest RI in the N pieces of CSI. This is not limited in this embodiment of this application.

In an example, it is assumed that N=4, four power offset values are 0 dB, 1 dB, 2 dB, and 3 dB, RIs of four pieces of CSI corresponding to the four power offset values are respectively RI=2, RI=3, RI=4, and RI=3, and location information of CSI with a highest RI in the four pieces of CSI is a highest RI of CSI corresponding to the 2 dB power offset value. In this case, the four pieces of CSI are sorted in ascending order of N power offset values corresponding to the four pieces of CSI, the second information is obtained. The second information includes the four pieces of CSI and the location information of the CSI with the highest RI in the four pieces of CSI. Details are shown in Table 2.

TABLE 2

| | CSI field |
|---|---|
| CSI reporting | Location information of the CSI with the highest RI |
| | CSI corresponding to the 0 dB power offset value (RI = 2) |
| | CSI corresponding to the 1 dB power offset value (RI = 3) |
| | CSI corresponding to the 2 dB power offset value (RI = 4) |
| | CSI corresponding to the 3 dB power offset value (RI = 3) |

Optionally, the terminal device sends the N pieces of CSI to the network device, and may further divide the N pieces of CSI into two or more parts, separately perform coding adjustment, and then transmit coded and modulated symbols together on one uplink channel. For example, each piece of CSI is divided into a CSI part 1 (part 1) and a CSI part 2 (part 2), N parts 1 of the N pieces of CSI are coded and transmitted together, and N parts 2 of the N pieces of CSI are coded and transmitted together. Optionally, the CSI part 1 and the CSI part 2 each include RI information and PMI information. In other words, N RIs and N PMIs are separately coded and reported. In this way, the network device may first decode and receive the N pieces of RI information, then determine a quantity of information bits of the PMI based on the RI information, and then receive the PMI information. Alternatively, optionally, a method for dividing the CSI part 1 and the CSI part 2 may be: The CSI part 1 includes the RI, the CSI part 2 includes other CSI information, and the other CSI information may include PMI information; or the CSI part 1 includes the RI and the CQI, the CSI part 2 includes other CSI information, and the other CSI information may include PMI information.

Optionally, a manner of determining the PMI in the (N−1) pieces of CSI other than the first CSI is predefined, and the N pieces of reported CSI include N RIs, one PMI, and N CQIs. In this way, reporting overheads of the PMI can be significantly reduced. The division method may be: The part 1 includes N RIs and one PMI; or the part 1 includes one RI and one PMI, and the part 2 includes (N−1) RIs. The CQI information may be placed in the part 1 or the part 2.

Optionally, the N pieces of CSI information include only one RI and one PMI. In this case, it should be understood that the N pieces of CSI have a same rank. In this case, reported content of the N pieces of CSI may include one RI, one PMI, and N CQIs. The foregoing content may be separately placed in the CSI part 1 and the CSI part 2. For example, one RI, one PMI, and N CQIs are placed in the part 1, and other information is placed in the part 2. Alternatively, one RI and one PMI are placed in the part 1, and N CQIs and other information is placed in the part 2.

Optionally, the terminal device sends the N pieces of CSI to the network device. Alternatively, the terminal device may separately perform coding and modulation on the first CSI and the remaining (N−1) pieces of CSI in the N pieces of CSI, and then send coded and modulated symbols on one uplink channel. The first CSI is CSI with a highest RI value. In this way, the network device first decodes and receives the first CSI, and may determine a quantity of information bits of the RI and the PMI in the subsequent (N−1) pieces of CSI based on the RI value in the first CSI. For example, if a RI value in the first CSI is L, and the PMI matrix corresponds to L column vectors, each of the remaining (N−1) pieces of CSI may be in the following manner:

(1) The RI needs to be indicated by ceil[log 2(L)] bits, and the RI value ranges from 1 to L; and/or (2) The PMI does not need to be indicated by a separate bit. If a corresponding RI value is L', the PMI includes L' column vectors, and is the first L' column vectors corresponding to the PMI matrix in the first CSI; or the PMI needs to be indicated by ceil[log 2($C_L^{L'}$)] bits. It is indicated that selecting L' column vectors from the L column vectors of the PMI matrix in the first CSI, and L' is an RI value in the CSI.

log 2(x) represents performing a logarithmic operation to base 2 on x, ceil[x] represents rounding up a real number x, and $C_L^{L'}$ represents a quantity of all selection manners of selecting L' elements from the L elements.

Optionally, the remaining (N−1) pieces of CSI may alternatively be divided into a CSI part 1 and a CSI part 2 for independent coding.

Optionally, the terminal device sends N pieces of CSI to the network device, separately performs coding and modulation on first CSI and remaining (N−1) pieces of CSI in the N pieces of CSI, places the first CSI in the CSI part 1, and places the remaining (N−1) pieces of CSI in the CSI part 2. The first CSI in the part 1 includes RI, PMI, and CQI information, and the remaining (N−1) pieces of CSI in the part 2 include RI, PMI, and CQI information.

To reduce RI overheads, the terminal device may indicate, in the CSI part 1, whether the remaining (N−1) pieces of CSI in the CSI part 2 include the RI. If it is indicated that the RI is not included, in the part 2, only the PMI and the CQI need to be fed back, and it is considered that rank values of the (N-1) pieces of CSI are the same as that of the first CSI. If it is indicated that the RI is included, the RI, the PMI, and the CQI of the (N-1) pieces of CSI need to be reported in the CSI part 2.

In the method described in FIG. 2, the terminal device receives the first indication information from the network device, and the first indication information indicates the M power offset values of the reference signal resource. In this manner, flexibility and consistency between the network device and the terminal device can be ensured. The terminal device determines, based on the M power offset values, the M pieces of channel state information CSI corresponding to the reference signal resource, to reduce measurement complexity of the terminal device. The terminal device sends N pieces of CSI in the M pieces of CSI to the network device. Correspondingly, the network device may select, from the N pieces of CSI corresponding to the N power offset values, one piece of CSI corresponding to one power offset value, and schedule the terminal device based on the CSI. In this manner, it can be ensured that power for data transmission adapts to or is the same as the transmit power of the channel state information reference signal as much as possible, flexibility of reducing the transmit power by the network device is improved, and impact of a data transmission power change on performance of the communication system is reduced.

It may be understood that, to implement the functions in the foregoing embodiments, a network device and a terminal device include corresponding hardware structures and/or software modules for performing the functions. A person skilled in the art should be easily aware that, in combination with the units and the method steps in the examples described in embodiments disclosed in this application, this application can be implemented by using hardware or a combination of hardware and computer software. Whether a function is performed by using hardware or hardware driven by computer software depends on particular application scenarios and design constraints of the technical solutions.

Figure 3:
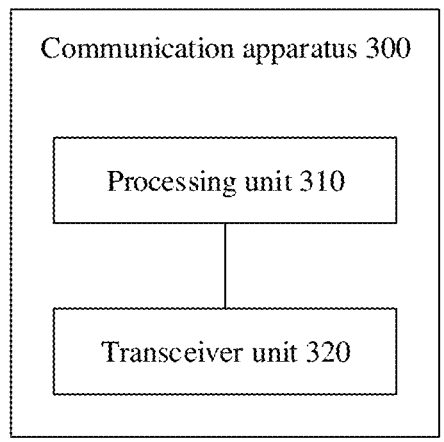
FIG. 3 is a schematic diagram of a structure of a communication apparatus according to an embodiment of this application.
Figure 4:
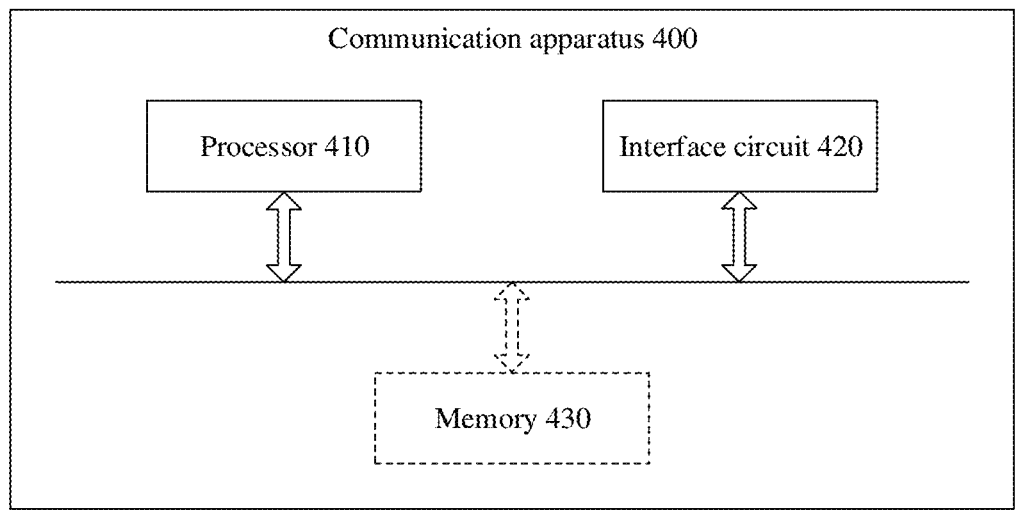
FIG. 4 is a schematic diagram of a structure of another communication apparatus according to an embodiment of this application.

FIG. 3 and FIG. 4 are schematic diagrams of structures of possible communication apparatuses according to embodiments of this application. The communication apparatus may be configured to implement functions of a terminal device or a network device in the foregoing method embodiment. Therefore, beneficial effects of the foregoing method embodiment can also be implemented. In embodiments of this application, the communication apparatus may be one of the terminal devices 101 to 106 shown in FIG. 1, or may be the network device 107 shown in FIG. 1, or may be a module (for example, a chip) applied to the terminal device or the network device.

As shown in FIG. 3, a communication apparatus 300 includes a processing unit 310 and a transceiver unit 320. The communication apparatus 300 is configured to implement functions of the terminal device or the network device in the foregoing method embodiment shown in FIG. 3.

When the communication apparatus 300 is configured to implement functions of the terminal device in the method embodiment shown in FIG. 2, the transceiver unit 320 is configured to receive first indication information from a network device. The first indication information indicates M power offset values of a reference signal resource, and M is an integer greater than or equal to 2. The processing unit 310 is configured to determine, based on the M power offset values, M pieces of channel state information CSI corresponding to the reference signal resource. One power offset value corresponds to one of the M pieces of CSI. The transceiver unit 320 is configured to send N pieces of CSI in the M pieces of CSI to the network device. N is a positive integer less than or equal to M.

When the communication apparatus 300 is configured to implement functions of the network device in the method embodiment shown in FIG. 2, the transceiver unit 320 is configured to send first indication information to a terminal device. The first indication information indicates M power offset values of a reference signal resource, and M is an integer greater than or equal to 2. The transceiver unit 320 is configured to receive, from the terminal device, N pieces of CSI in M pieces of channel state information CSI corresponding to the reference signal resource. The M pieces of channel state information CSI corresponding to the reference signal resource are determined by the terminal device based on the M power offset values, one power offset value corresponds to one of the M pieces of CSI, and N is a positive integer less than or equal to M.

For more detailed descriptions of the processing unit 310 and the transceiver unit 320, directly refer to related descriptions of the method embodiment shown in FIG. 2. Details are not described herein again.

It should be noted that for implementation and beneficial effects of the modules, refer to corresponding descriptions of the method embodiment shown in FIG. 2.

As shown in FIG. 4, a communication apparatus 400 includes a processor 410 and an interface circuit 420. The processor 410 and the interface circuit 420 are coupled to each other. It may be understood that the interface circuit 420 may be a transceiver or an input/output interface. Optionally, the communication apparatus 400 may further include a memory 430, configured to store instructions to be executed by the processor 410, store input data required for running the instructions by the processor 410, or store data generated after the processor 410 runs the instructions.

When the communication apparatus 400 is configured to implement the method shown in FIG. 2, the processor 410 is configured to implement functions of the processing unit 301, and the interface circuit 420 is configured to implement functions of the transceiver unit 302.

When the communication apparatus is a chip applied to a terminal device, the terminal chip implements functions of the terminal device in the foregoing method embodiment. The terminal chip receives information from another module (for example, a radio frequency module or an antenna) in the terminal device, where the information is sent by a network device to the terminal device. Alternatively, the terminal chip sends information to another module (for example, a radio frequency module or an antenna) in the terminal device, where the information is sent by the terminal device to a network device.

When the communication apparatus is a module applied to a network device, the module of the network device implements functions of the network device in the foregoing method embodiment. The module of the network device receives information from another module (for example, a radio frequency module or an antenna) in the network device, where the information is sent by a terminal device to the network device. Alternatively, the module of the network device sends information to another module (for example, a radio frequency module or an antenna) in the network device, where the information is sent by the network device to a terminal device. The module of the network device herein may be a baseband chip of the network device, or may be a DU or another module. The DU herein may be a DU in an open radio access network (open radio access network, O-RAN) architecture.

It can be understood that the processor in this embodiment of this application may be a central processing unit (Central Processing Unit, CPU), or may be another general purpose processor, a digital signal processor (Digital Signal Processor, DSP), an application-specific integrated circuit (Application Specific Integrated Circuit, ASIC), a field programmable gate array (Field Programmable Gate Array, FPGA) or another programmable logic device, a transistor logic device, a hardware component, or any combination thereof. The general purpose processor may be a microprocessor or any regular processor or the like.

The method steps in embodiments of this application may be implemented in a hardware manner, or may be implemented in a manner of executing software instructions by the processor. The software instructions may include a corresponding software module. The software module may be stored in a random access memory, a flash memory, a read-only memory, a programmable read-only memory, an erasable programmable read-only memory, an electrically erasable programmable read-only memory, a register, a hard disk, a removable hard disk, a CD-ROM, or any other form of storage medium well-known in the art. For example, a storage medium is coupled to a processor, so that the processor can read information from the storage medium and write information into the storage medium. Certainly, the storage medium may be a component of the processor. The processor and the storage medium may be disposed in an ASIC. In addition, the ASIC may be located in a base station or a terminal. Certainly, the processor and the storage medium may exist in a base station or terminal as discrete components.

All or some of the foregoing embodiments may be implemented by software, hardware, firmware, or any combination thereof. When software is used to implement the embodiments, all or some of the embodiments may be implemented in a form of a computer program product. The computer program product includes one or more computer programs or instructions. When the computer programs or instructions are loaded and executed on a computer, all or some of the procedures or functions in embodiments of this application are executed. The computer may be a general-purpose computer, a dedicated computer, a computer network, a network device, user equipment, or another programmable apparatus. The computer programs or instructions may be stored in a computer-readable storage medium, or may be transmitted from a computer-readable storage medium to another computer-readable storage medium. For example, the computer programs or instructions may be transmitted from a website, computer, server, or data center to another website, computer, server, or data center in a wired manner or in a wireless manner. The computer-readable storage medium may be any usable medium that can be accessed by a computer, or a data storage device, such as a server or a data center, integrating one or more usable media. The usable medium may be a magnetic medium, for example, a floppy disk, a hard disk, or a magnetic tape; or may be an optical medium, for example, a digital video disc; or may be a semiconductor medium, for example, a solid state disk. The computer-readable storage medium may be a volatile or nonvolatile storage medium, or may include two types of storage media: a volatile storage medium and a nonvolatile storage medium.

In embodiments of this application, unless otherwise stated or there is a logic conflict, terms and/or descriptions between different embodiments are consistent and may be mutually referenced, and technical features in different embodiments may be combined into a new embodiment based on an internal logical relationship thereof.

It may be understood that various numbers in embodiments of this application are merely used for differentiation for ease of description, and are not used to limit the scope of embodiments of this application. The sequence numbers of the foregoing processes do not mean an execution sequence, and the execution sequence of the processes should be determined based on functions and internal logic of the processes.

What is claimed is:

1. A communication method, comprising:
  receiving first indication information, wherein the first indication information indicates M power offset values of a reference signal resource, M is an integer greater than or equal to 2, and each power offset value is an assumption of a ratio of energy per resource element (EPRE) on a physical downlink shared channel (PDSCH) to an EPRE of a channel state information reference signal (CSI-RS);
  determining, based on the M power offset values, M pieces of channel state information (CSI) corresponding to the reference signal resource, wherein each power offset value has a one-to-one correspondence with a piece of CSI of the M pieces of CSI; and
  sending N pieces of CSI in the M pieces of CSI, wherein N is a positive integer less than M, transmission efficiency of any of the N pieces of CSI is higher than transmission efficiency of any of (M-N) pieces of CSI, and the (M-N) pieces of CSI are CSI other than the N pieces of CSI in the M pieces of CSI; and
  wherein the transmission efficiency of each piece of CSI is determined based on at least one of a rank indicator (RI) or a channel quality indicator (CQI) of the respective piece of CSI.

2. The method according to claim 1, further comprising:
  receiving second indication information, wherein the second indication information indicates N power offset values corresponding to the N pieces of CSI.

3. The method according to claim 1, further comprising:
  determining the M power offset values based on a power control offset value and M power back-off values, wherein an $m^{th}$ power offset value is a difference between the power control offset value and an $m^{th}$ power back-off value.

4. The method according to claim 1, wherein:
  the N pieces of CSI comprise a K1th piece of CSI and a $K2^{th}$ piece of CSI, K1 and K2 are positive integers, K1 is less than K2, and an RI of the K1th piece of CSI is higher than or equal to an RI of the $K2^{th}$ piece of CSI.

5. A method, comprising:
  sending first indication information, wherein the first indication information indicates M power offset values of a reference signal resource, M is an integer greater than or equal to 2, and each power offset value is an assumption of a ratio of energy per resource element (EPRE) on a physical downlink shared channel (PDSCH) to an EPRE of a channel state information reference signal (CSI-RS); and
  receiving N pieces of CSI in M pieces of channel state information (CSI) corresponding to the reference signal resource, wherein the M pieces of CSI corresponding to the reference signal resource are determined by a terminal device based on the M power offset values, each power offset value has a one-to-one correspondence with a piece of CSI of the M pieces of CSI, and N is a positive integer less than M, transmission efficiency of any of the N pieces of CSI is higher than a transmission efficiency of any of (M-N) pieces of CSI, and the (M-N) pieces of CSI are CSI other than the N pieces of CSI in the M pieces of CSI; and wherein the transmission efficiency of each piece of CSI is determined based on at least one of a rank indicator (RI) or a channel quality indicator (CQI) of the respective piece of CSI.

6. The method according to claim 5, further comprising: sending second indication information, wherein the second indication information indicates N power offset values corresponding to the N pieces of CSI.

7. The method according to claim 5, wherein the M power offset values are determined based on a power control offset value and M power back-off values, and an $m^{th}$ power offset value is a difference between the power control offset value and an $m^{th}$ power back-off value.

8. The method according to claim 5, wherein:
the N pieces of CSI comprise a Kith piece of CSI and a $K2^{th}$ piece of CSI, K1 and K2 are positive integers, K1 is less than K2, and a rank indicator (RI) of the Kith piece of CSI is higher than or equal to an RI of the $K2^{th}$ piece of CSI.

9. A communication apparatus, comprising one or more processors and a communication interface, wherein the one or more processors are configured to execute operations comprising:
receiving first indication information, wherein the first indication information indicates M power offset values of a reference signal resource, M is an integer greater than or equal to 2, and each power offset value is an assumption of a ratio of energy per resource element (EPRE) on a physical downlink shared channel (PDSCH) to an EPRE of a channel state information reference signal (CSI-RS);
determining, based on the M power offset values, M pieces of CSI corresponding to the reference signal resource, wherein each power offset value has a one-to-one correspondence with a piece of CSI of the M pieces of CSI; and
sending N pieces of CSI in the M pieces of CSI, wherein N is a positive integer less than M, a transmission efficiency of any of the N pieces of CSI is higher than a transmission efficiency of any of (M-N) pieces of CSI, and the (M-N) pieces of CSI are CSI other than the N pieces of CSI in the M pieces of CSI; and
wherein the transmission efficiency of each piece of CSI is determined based on at least one of a rank indicator (RI) or a channel quality indicator (COI) of the respective piece of CSI.

10. The communication apparatus according to claim 9, wherein the one or more processors are further configured to execute operations comprising:
receiving second indication information, wherein the second indication information indicates N power offset values corresponding to the N pieces of CSI.

11. The communication apparatus according to claim 9, wherein the one or more processors are further configured to execute operations comprising:
determining the M power offset values based on a power control offset value and M power back-off values, wherein an $m^{th}$ power offset value is a difference between the power control offset value and an $m^{th}$ power back-off value.

12. The communication apparatus according to claim 9, wherein:
the N pieces of CSI comprise a Kith piece of CSI and a $K2^{th}$ piece of CSI, K1 and K2 are positive integers, K1 is less than K2, and a rank indicator (RI) of the Kith piece of CSI is higher than or equal to an RI of the $K2^{th}$ piece of CSI.

13. A communication apparatus, comprising one or more processors and a communication interface, wherein the one or more processors are configured to execute operations comprising:
sending first indication information, wherein the first indication information indicates M power offset values of a reference signal resource, M is an integer greater than or equal to 2, and each power offset value is an assumption of a ratio of energy per resource element (EPRE) on a physical downlink shared channel (PDSCH) to an EPRE of a channel state information reference signal (CSI-RS); and
receiving N pieces of CSI in M pieces of channel state information (CSI) corresponding to the reference signal resource, wherein the M pieces of CSI corresponding to the reference signal resource are determined by a terminal device based on the M power offset values, each power offset value has a one-to one correspondence with a piece of CSI of the M pieces of CSI, and N is a positive integer less than M, a transmission efficiency of any of the N pieces of CSI is higher than a transmission efficiency of any of (M-N) pieces of CSI, and the (M-N) pieces of CSI are CSI other than the N pieces of CSI in the M pieces of CSI; and
wherein the transmission efficiency of each piece of CSI is determined based on at least one of a rank indicator (RI) or a channel quality indicator (CQI) of the respective piece of CSI.

14. The communication apparatus according to claim 13, wherein the one or more processors are further configured to execute operations comprising:
sending second indication information, wherein the second indication information indicates N power offset values corresponding to the N pieces of CSI.

15. The communication apparatus according to claim 13, wherein the M power offset values are determined based on a power control offset value and M power back-off values, and an $m^{th}$ power offset value is a difference between the power control offset value and an $m^{th}$ power back-off value.

16. The communication apparatus according to claim 13, wherein:
the N pieces of CSI comprise a Kith piece of CSI and a $K2^{th}$ piece of CSI, K1 and K2 are positive integers, K1 is less than K2, and an RI of the Kith piece of CSI is higher than or equal to a rank indicator (RI) of the $K2^{th}$ piece of CSI; or
the N pieces of CSI comprise an Lith piece of CSI and an $L2^{th}$ piece of CSI, L1 and L2 are positive integers, L1 is less than L2, and a power offset value corresponding to the Lith piece of CSI is greater than a power offset value corresponding to the $L2^{th}$ piece of CSI.

17. The method according to claim 1, wherein:
the N pieces of CSI comprise an Lith piece of CSI and an $L2^{th}$ piece of CSI, L1 and L2 are positive integers, L1 is less than L2, and a power offset value corresponding to the Lith piece of CSI is greater than a power offset value corresponding to the $L2^{th}$ piece of CSI.

18. The method according to claim 5, wherein:
the N pieces of CSI comprise an Lith piece of CSI and an $L2^{th}$ piece of CSI, L1 and L2 are positive integers, L1 is less than L2, and a power offset value corresponding to the Lith piece of CSI is greater than a power offset value corresponding to the $L2^{th}$ piece of CSI.

19. The communication apparatus according to claim 9, wherein:

the N pieces of CSI comprise an Lith piece of CSI and an $L2^{th}$ piece of CSI, L1 and L2 are positive integers, L1 is less than L2, and a power offset value corresponding to the Lith piece of CSI is greater than a power offset value corresponding to the $L2^{th}$ piece of CSI.

* * * * *

UNITED STATES PATENT AND TRADEMARK OFFICE
CERTIFICATE OF CORRECTION

Page 1 of 2

PATENT NO. : 12,483,311 B2
APPLICATION NO. : 18/405760
DATED : November 25, 2025
INVENTOR(S) : Li et al.

It is certified that error appears in the above-identified patent and that said Letters Patent is hereby corrected as shown below:

In the Claims

Column 26, in Claim 4, Line 47, delete "Kith" and insert -- $K1^{th}$ --.

Column 26, in Claim 4, Line 49, delete "Kith" and insert -- $K1^{th}$ --.

Column 27, in Claim 8, Line 19, delete "Kith" and insert -- $K1^{th}$ --.

Column 27, in Claim 8, Line 21, delete "Kith" and insert -- $K1^{th}$ --.

Column 27, in Claim 9, Line 49, delete "(COI)" and insert -- (CQI) --.

Column 28, in Claim 12, Line 3, delete "Kith" and insert -- $K1^{th}$ --.

Column 28, in Claim 12, Line 5, delete "Kith" and insert -- $K1^{th}$ --.

Column 28, in Claim 16, Line 49, delete "Kith" and insert -- $K1^{th}$ --.

Column 28, in Claim 16, Line 51, delete "Kith" and insert -- $K1^{th}$ --.

Column 28, in Claim 16, Line 54, delete "Lith" and insert -- $L1^{th}$ --.

Column 28, in Claim 16, Line 57, delete "Lith" and insert -- $L1^{th}$ --.

Column 28, in Claim 17, Line 60, delete "Lith" and insert -- $L1^{th}$ --.

Column 28, in Claim 17, Line 63, delete "Lith" and insert -- $L1^{th}$ --.

Signed and Sealed this
Twenty-seventh Day of January, 2026

John A. Squires
*Director of the United States Patent and Trademark Office*

Column 28, in Claim 18, Line 66, delete "Lith" and insert -- $L1^{th}$ --.

Column 29, in Claim 18, Line 2, delete "Lith" and insert -- $L1^{th}$ --.

Column 29, in Claim 19, Line 6, delete "Lith" and insert -- $L1^{th}$ --.

Column 29, in Claim 19, Line 9, delete "Lith" and insert -- $L1^{th}$ --.